US008926199B1

(12) United States Patent
Chan et al.

(10) Patent No.: US 8,926,199 B1
(45) Date of Patent: Jan. 6, 2015

(54) FIBER TO LENS ATTACH DEVICE, SYSTEM, AND METHOD

(71) Applicant: Avago Technologies General IP (Singapore) Pte. Ltd., Singapore (SG)

(72) Inventors: Seng-Kum Chan, Santa Clara, CA (US); Andrew Schmit, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/028,257

(22) Filed: Sep. 16, 2013

(51) Int. Cl.
*G02B 6/36* (2006.01)
*G02B 6/42* (2006.01)
*G02B 6/46* (2006.01)

(52) U.S. Cl.
CPC .............. *G02B 6/4257* (2013.01); *G02B 6/46* (2013.01)
USPC .................... 385/93; 385/76; 385/79; 385/89

(58) Field of Classification Search
CPC ...... G02B 6/4204; G02B 6/32; G02B 6/3897; G02B 6/3829; G02B 6/125

USPC ....................................................... 385/88–94
See application file for complete search history.

(56) References Cited

U.S. PATENT DOCUMENTS

| 5,647,042 | A | 7/1997 | Ochiai et al. | |
| 7,441,965 | B2 * | 10/2008 | Furuno et al. | 385/93 |
| 8,079,125 | B2 | 12/2011 | Ban et al. | |
| 8,485,738 | B2 * | 7/2013 | Rosenberg et al. | 385/76 |
| 8,529,140 | B2 * | 9/2013 | McColloch | 385/89 |
| 2009/0310907 | A1 * | 12/2009 | Ikeda et al. | 385/14 |
| 2010/0135618 | A1 * | 6/2010 | Howard et al. | 385/79 |

OTHER PUBLICATIONS

Ofs Leading Optical Innovations, Epoxy Installation Procedures for ST II Fiber Optic Connectors (Multimode and Singlemode), Fitel USA Corp, Jan. 2002, 24 pages.

* cited by examiner

*Primary Examiner* — Ellen Kim

(57) ABSTRACT

A device, system, and method of attaching fiber optics to a transceiver are provided. Specifically, a connector module may include a fiber input angled relative to a lens groove or set of grooves such that the inherent stiffness of the fiber can be used to provide a positive pressure of the fiber when attaching the fiber to the groove or set of grooves.

20 Claims, 7 Drawing Sheets

FIBER TO LENS ATTACH DEVICE, SYSTEM, AND METHOD

FIELD OF THE DISCLOSURE

The present disclosure is generally directed toward optical fibers and more specifically toward attachment mechanisms for optical fibers.

BACKGROUND

Trying to keep fibers in a v-groove of an optical transceiver while applying an adhesive can be challenging. One way to address the challenge is to apply pressure onto the fibers with a probe. Another way to address the challenge is to apply pressure onto a cover over the fibers. The problem with these techniques is the difficulty of applying even pressure across all fibers without some fibers lifting out of the v-groove.

Another problem with existing attachment schemes is that if the v-groove goes to the face where the fiber tip ends, there is an increased likelihood that the adhesive used to connect the fiber to the v-groove will delaminate. Specifically, thermal stresses can delaminate the adhesive near the fiber end which causes an air gap or deformation in the optical path. This may ultimately result in the entire optical transceiver failing.

Yet another problem with existing attachment schemes is that commercial parallel optics require a secondary clip that gets snapped onto the lens. This clip is what holds down the lens into the receiving block. The lens typically has two pins which are positioned into matching holes and the cover is snapped onto matched features in the receiving block. This type of attachment scheme is somewhat complicated.

BRIEF DESCRIPTION OF THE DRAWINGS

The present disclosure is described in conjunction with the appended figures, which are not necessarily drawn to scale.

DETAILED DESCRIPTION

Figure 1:
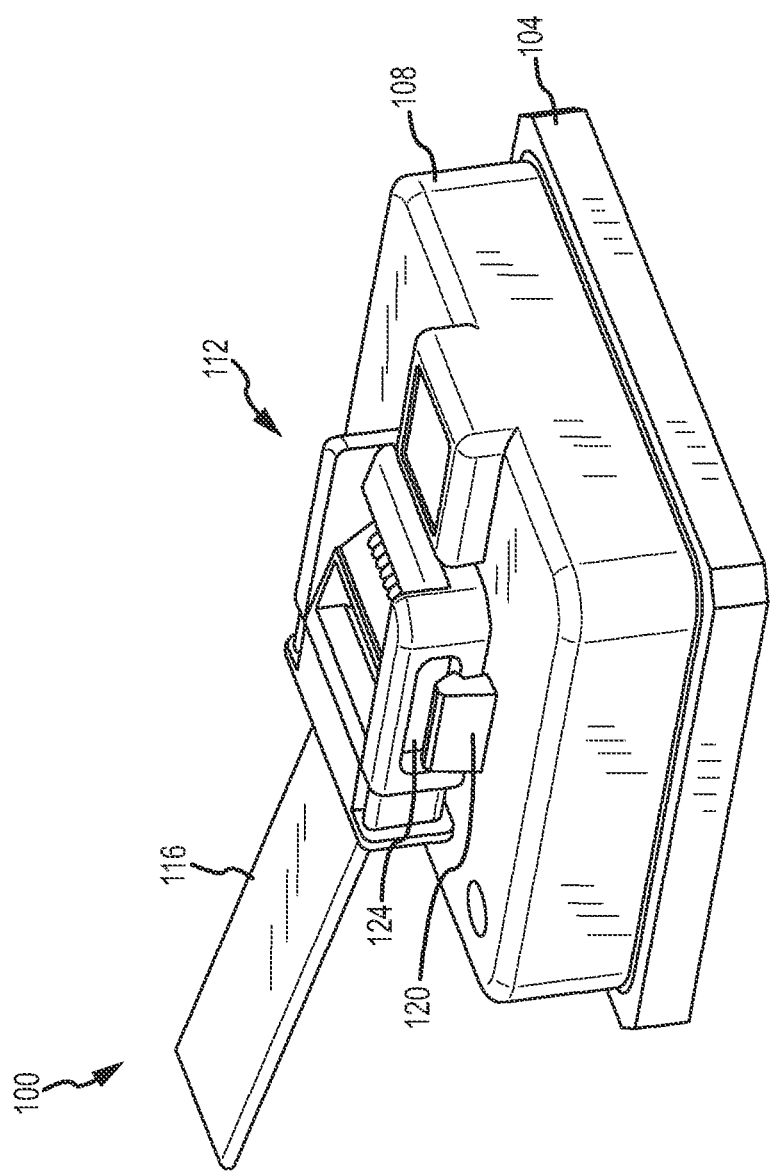
FIG. 1 depicts an optical system in accordance with at least some embodiments of the present disclosure.

Various aspects of the present disclosure will be described herein with reference to drawings that are schematic illustrations of idealized configurations. As such, variations from the shapes of the illustrations as a result, for example, manufacturing techniques and/or tolerances, are to be expected. Thus, the various aspects of the present disclosure presented throughout this document should not be construed as limited to the particular shapes of elements (e.g., regions, layers, sections, substrates, etc.) illustrated and described herein but are to include deviations in shapes that result, for example, from manufacturing. The elements illustrated in the drawings are schematic in nature and their shapes and should not be construed as limiting embodiments of the present disclosure to the precise shape of an illustrated element.

It will be understood that when an element such as a region, layer, section, substrate, module, component, or the like, is referred to as being "on" another element, it can be directly on the other element or intervening elements may also be present. In contrast, when an element is referred to as being "directly on" another element, there are no intervening elements present.

Furthermore, relative terms, such as "lower" or "bottom" and "upper" or "top" may be used herein to describe one element's relationship to another element as illustrated in the drawings. It will be understood that relative terms are intended to encompass different orientations of an apparatus in addition to the orientation depicted in the drawings. By way of example, if an apparatus in the drawings is turned over, elements described as being on the "lower" side of other elements would then be oriented on the "upper" side of the other elements. The term "lower" can, therefore, encompass both an orientation of "lower" and "upper" depending of the particular orientation of the apparatus. Similarly, if an apparatus in the drawing is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

It is with respect to the above-noted shortcomings that embodiments of the present disclosure were envisioned. In particular, embodiments of the present disclosure contemplate a system, device, and method for enhancing fiber-to-lens attachments. More specifically, embodiments of the present disclosure will be directed toward attachment strategies with reference to parallel fiber optics. It should be appreciated, however, that embodiments of the present disclosure are not limited to parallel fiber optics.

It is one aspect of the present disclosure to construct the grooves and fiber input such that the fibers are guided into the opening of the fiber input and pivoted to force a positive pressure into the groove, without requiring an external cover or mechanical probe. A second fiber retainer or piece part can then be snapped on or pressed into a first fiber retainer or piece part to hold the fiber in the positive pressure position. This uses the inherent stiffness of the fiber as the force to keep the fibers in contact with the grooves of the lens. Thus, the application of an adhesive to secure the fibers to the grooves becomes an easy final step in connecting the fiber to the lens.

It is another aspect of the present disclosure to minimize the chances of the fiber tip ends from delaminating from the grooves. As an example, embodiments of the present disclosure contemplate a step-back feature or step-back well that separates the grooves from the face where the fiber tip ends terminate. This will allow adhesive to fill into the step-back well and not have groove contact near the fiber tip end.

Another aspect of the present disclosure is to provide a better solution for mating the lens with the main connector. Specifically, embodiments of the present disclosure contemplate a lens configured with a mating feature that is received at a complimentary feature on a main connector module. The main connector module may further comprise a clipping feature to hold the lens into the main connector module, by way of the mating feature interacting with the complimentary feature on the main connector module. The utilization of a mating feature and clipping feature essentially reduces the need for a separate secondary clip. Furthermore, the mating feature makes the measurement verification and tooling easier than existing two-pin structures.

With reference now to FIGS. 1-6B, various concepts and concepts related to improving a fiber-to-lens attachment within an optical system 100 will be described. With FIG. 1 depicts an optical system 100 comprising a substrate or Printed Circuit Board (PBC) 104, a main connector module 108, a second connector module 112, and fiber 116. The second connector module 112 is further depicted as interfacing and connecting with the main connector module 108 via a clip 120 and notch 124 interaction.

In some embodiments, the fiber 116 may correspond to any type of fiber-optic communication medium. Specifically, the fiber 116 may correspond to a single piece of fiber optic cable, ribbon fiber optics, or the like. In other words, the fiber 116 may include any optically-transparent fiber (e.g., constructed of extruded glass or plastic) configured to function as a waveguide or light pipe to transmit light between the two ends of the fiber. As an example, the fiber 116 may be configured for use in an optical communication network.

The PCB 104 may correspond to any type of known PCB. As some non-limiting examples, the PCB 104 may comprise a rigid or flexible substrate on which one or more electrically conductive contact pads, traces, and/or vias are provided. The PCB 104, in some embodiments, may be incorporated within or be a part of communications equipment within an optical communications network. For instance, the PCB 104 may be contained within a boosting station, a server, a switch, an endpoint/client device, or the like. In some embodiments, the PCB 104 may be used to support electronic and/or optical components in addition to providing electrical connections between electronic and/or optical components.

The main connector module 108 may correspond to a first component of the optical system 100 that essentially houses the electronic and/or optical components mounted on the PCB 104. In some embodiments, the main connector module 108 is constructed of plastic or some other non-conductive material. The main connector module 108 may also function as an interface between the second connector module 112 and the PCB 104. Like the main connector module 108, the second connector module 112 may also be constructed of plastic or some other non-conductive material. The second connector module 112 may also be referred to as a lens or having lens components. Thus, the second connector module 112 functions to interface with the optical fiber 116 in addition to carrying light between the fiber 116 and optical components mounted on the PCB 104. While the second connector module 112 may not be entirely constructed of light-carrying materials, it should be appreciated that the second connector module 112 may at least partially comprise some light-carrying material or medium. As an example, the second connector module 112 may comprise light-carrying materials (e.g., lens components) molded within light-blocking components (e.g., black plastic, white plastic, etc.).

In some embodiments, the main connector module 108 may be fixedly attached or removably attached to the PCB 104. The main connector module 108 may further comprise one or more features that help position the second connector module 112 relative to the PCB 104. As an example, the main connector module 108 may function to substantially fix a position of the second connector module 112 relative to the PCB 104 so that the lens components of the second connector module 112 are appropriately positioned relative to optical components mounted on the PCB 104.

As shown in FIG. 1, the second connector module 112 is shown as being removably attachable to the main connector module 108. In particular, the main connector module 108 is shown to include at least one clip 120 and the second connector module 112 is shown to include at least one notch 124. Although not depicted in FIG. 1, it should be appreciated that the main connector module 108 may comprise a pair of clips 120 and the second connector module 112 may comprise a pair of corresponding notches 124 to substantially fix the position of the second connector module 112 along at least one axis. Additional clips or blocking features may further help fix the position of the second connector module 112 relative to the main connector module 108 along a second axis. The clip 120 and notch 124 may function to fix the second connector module 112 in position relative to the main connector module 108, for example, by use of a friction fit. It should be appreciated that the second connector module 112 may be provided with the clip 120 and the main connector module 108 may be provided with the notch 124 without departing from the scope of the present disclosure. It should also be appreciated that other connection features or mechanisms may be used. As non-limiting examples, adhesives, screws, posts, bolts, and the like may also be used to secure the second connector module 112 to the main connector module 108.

Figure 2:
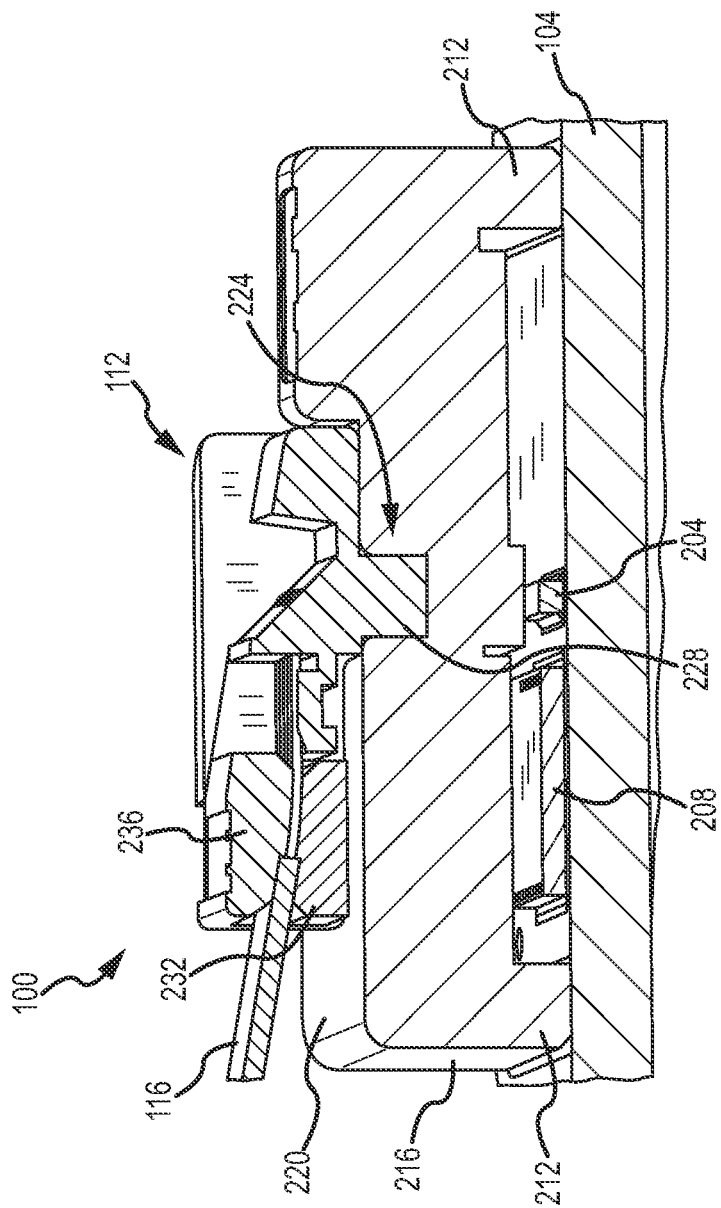
FIG. 2 is a cross-sectional view of the optical system depicted in FIG. 1.

FIG. 2 depicts additional details of the interface between the main connector module 108 and second connector module 112 as well as components that may be mounted on the PCB 104 in accordance with embodiments of the present disclosure. Specifically, the main connector module 108 is shown to include a perimeter member 212, a side surface 216, a top surface 220, and a receiving block 224. The perimeter member 212 may provide a separation between the main body of the main connector module 108 and the PCB 104, thereby creating a gap or cavity between the PCB 104 and main connector module 108. As mentioned above, electronic components 208 (e.g., LRC components, Integrated Circuits (ICs), diodes, and the like) and/or optical components 204 (e.g., Vertical-Cavity Surface-Emitting Laser (VCSEL), laser diode, Light Emitting Diode (LED), array of LEDs, photodiode, photosensor, etc.) may be mounted to the top surface of the PCB 104. Furthermore, the optical components 204 may be electrically connected to the electronic components 208 via traces, vias, and/or bonding pads of the PCB 104.

In some embodiments, the perimeter member 212 of the main connector module 108 is configured to completely enclose the optical components 204 within the cavity between the main connector module 108 and PCB 104. The side surface 216 of the main connector module 108 may extend from the PCB 104 to the top surface 220. In some embodiments, the top surface 220 may comprise a receiving block 224 configured to cooperate with a protruding feature 228 of the second connector module 112. Specifically, the main connector module 108 may comprise a female feature for receiving a male or protruding feature 228 of the second connector module 112. In other embodiments, the receiving block or female feature 224 may be provided on the second connector module 112 and the protruding feature 228 may be provided on the main connector module 108.

In accordance with at least some embodiments of the present disclosure, the receiving block 224 interfaces with the protruding feature 228 to substantially fix the position of the second connector module 112 relative to the first connector module 108 in both axes parallel to the top surface 220 (or top surface of the PCB 104). The utilization of the receiving block 224 and protruding feature 228 enables the second connector module 112 to easily fit into the appropriate location relative to the main connector module 108. Moreover, with the utilization of the receiving block 224 and protruding feature 228 in addition to the utilization of the clips 120 and notches 124, the position of the second connector module 112 can be substantially fixed in three dimensions relative to the main connector module 108.

FIG. 2 also depicts additional details of the interface between the fiber 116 and second connector module 112. More specifically, the fiber 116 is fixed relative to the second connector module 112 with a pair of fiber retainers 232, 236. More specifically, a first fiber retainer 232 may be provided on one side of the fiber 116 and a second fiber retainer 236 may be provided on the second side of the fiber 116. The first and second fiber retainers 232, 236 may connect to one another such that the position of the fiber 116 is substantially fixed relative to the second connector module 112 and lens components thereof. In some embodiments, the second connector module 112 may integrally comprise one of the fiber retainers (e.g., second fiber retainer 236) while the other fiber retainer (e.g., first fiber retainer 232) may correspond to a separate piece part that attached to the second connector module 112. In some embodiments, the first fiber retainer 232 is adapted to rest atop and be supported by the top surface 220 of the main connector module 108. With the fiber 116 properly positioned between the fiber retainers 232, 236 and the second connector module 112 appropriately positioned with respect to the main connector module 108, the optical system 100 may be adapted to facilitate optical communications via transmission of optical signals over the fiber 116 to/from the optical components 204 housed within the main connector module 108.

Figure 3:
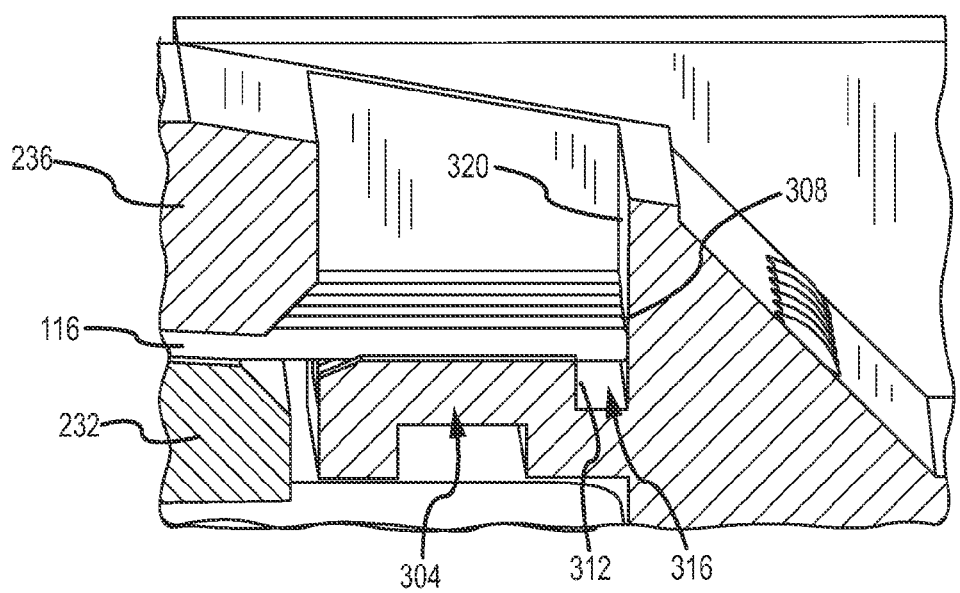
FIG. 3 is a detailed cross-sectional view of the optical system depicted in FIG. 1.

With reference now to FIG. 3, additional details of the interaction between the fiber 116 and second connector module 112 will be described in accordance with at least some embodiments of the present disclosure. The second connector module 112 is shown to include a plurality of grooves 304 (e.g., grooves), a step-back feature 312, a step-back well 316, and an end wall 320. The fiber 116 is shown to include fiber ends 308 that rest substantially against the end wall 320. In some embodiments, the end wall 320 corresponds to a lens component of the second connector module 112. More specifically, the end wall 320 may correspond to a point where light enters a prismatic component of the second connector module 112. The prismatic or lens component may be responsible for directing light between the fiber 116 and the optical components 204 mounted on the PCB 104.

The step-back well 316 creates a distance between the end wall 320 and step-back feature 312 of the grooves 304. The inclusion of a step-back well 316 provides a location where adhesive or epoxy can attach directly to the fiber 116 without connecting to the grooves 304 as well. This substantially decreases the chances of delamination at the contact points between the fiber ends 308 and end wall 320. Furthermore, the step-back well 316 also minimizes or obviates the need for the fiber 116 to contact the end wall 320 while being in simultaneous contact with the grooves 304.

Figure 4:
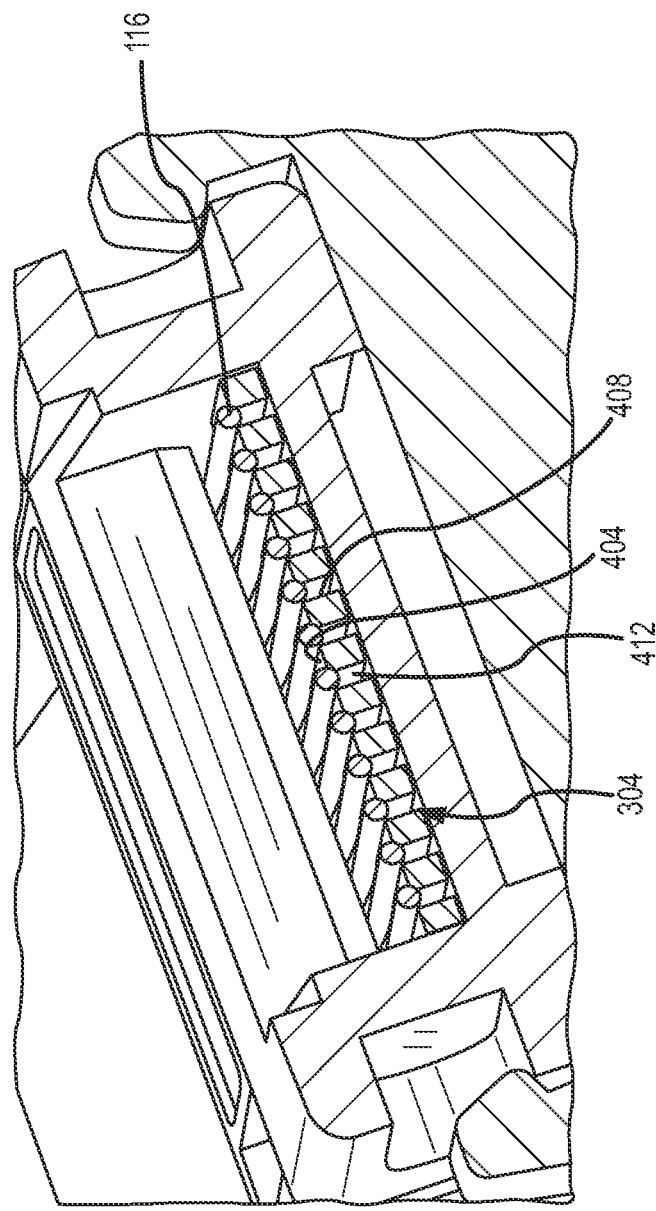
FIG. 4 is a cross-sectional view of fiber interfacing with grooves in accordance with embodiments of the present disclosure.

FIG. 4 depicts a cross-sectional view of the grooves 304 in accordance with embodiments of the present disclosure. In some embodiments, the grooves 304 correspond to grooves, which are traditionally v-grooves in fiber-optic connectors. The present disclosure, on the other hand, provides rectangular ridges for the grooves 304. More specifically, the grooves 304 are shown to include a substantially planar top surface 404 connecting a first side surface 408 and a second side surface 412. In some embodiments, the number of grooves 304 is greater than or equal to the number of individual fibers in the fiber 116. Each fiber may be configured to contact the grooves 304 at the intersection of a top surface 404 and side surface 408 or 412. Thus, each individual fiber may have two different contact points with the grooves 304.

In some embodiments, the side surfaces 408, 412 of the grooves 304 are substantially planar and perpendicular with respect to the top surface 404. Thus, the side surfaces 408, 412 may be substantially parallel with one another. Furthermore, the distance between side surfaces 408, 412 may be less than a diameter of the individual fiber, thereby ensuring that each individual fiber has at least partial contact with the top surface 404 of two different ridges (e.g., sits within a single groove without falling to the bottom of the groove). The rectangular grooves 304 depicted herein make measurement verification and tooling significantly easier as compared to traditional v-groove counterparts.

Figure 5:
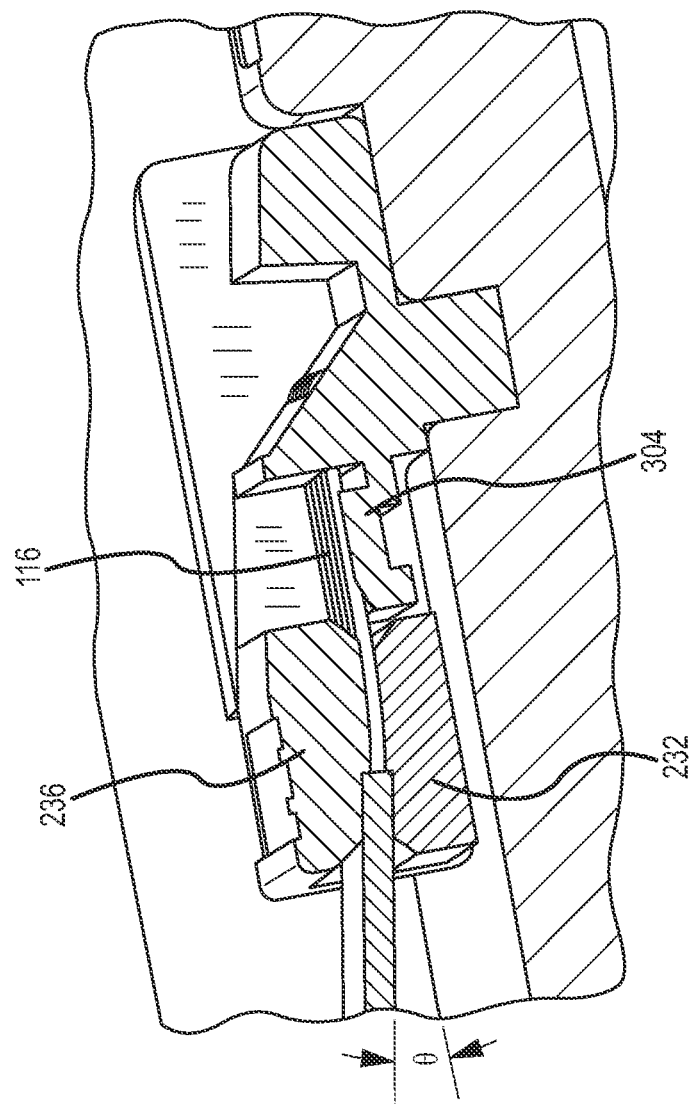
FIG. 5 is a cross-sectional view showing the use of positive pressure to maintain fiber in grooves in accordance with embodiments of the present disclosure.

With reference now to FIG. 5, additional details of the interaction between the first fiber retainer 323 and second fiber retainer 236 will be described in accordance with embodiments of the present disclosure. In particular, the fiber retainers 232, 236 are shown to position the fiber 116 at an angle θ relative to the top surface 220 of the main connector module 108. In some embodiments, the angle θ enables the fibers 116 to be guided toward the grooves 304 at an offset angle. Furthermore, the angle θ causes the fibers 116 to pivot with respect to the grooves 304, which results in a positive pressure being applied to the fibers 116. This positive pressure is applied due to the inherent stiffness of the fibers 116. In some embodiments, the angle θ may be any angle between 1 degree and 45 degrees, with a preferred angle being between 4 degrees and 10 degrees. In some embodiments, the second fiber retainer 236 may be integral to the second connector module 112, which means that the second connector module 112 may first be attached to the main connector module 108 via the receiving block 224 and protruding feature 228. Thereafter, the fiber 116 may be inserted between the grooves 304 and second fiber retainer 236. Thanks to the angle θ between the bottom surface of the second fiber retainer 236 and the grooves 304, the fiber 116 is pivoted and forced to sit substantially flush with the top surfaces 404 of the grooves 304. Meanwhile, the separate piece part in the form of the first fiber retainer 232 may be snapped on or pressed into the gap between the fiber 116 and the top surface 220 of the main connector module 108. Once the first fiber retainer 232 is in place, the fiber 116 is substantially fixed relative to the grooves 304, thereby fixing the fiber ends 308 with respect to the end wall 320. At this point, an adhesive or the like may be applied to substantially fix the fiber 116 relative to the grooves 304 and end wall 320.

As can be appreciated, the adhesive used to fix the fiber 116 to the second connector module 112 may comprise any type of optical-grade adhesive. More specifically, the adhesive may be selected so as to have an index of refraction that is similar or identical to an index of refraction of the fiber 116 and/or lens component contained within the second connector module 112. The matching of the adhesive's index of refraction to the fiber 116 and/or lens component helps reduce back reflections and optical losses.

Figure 6A:
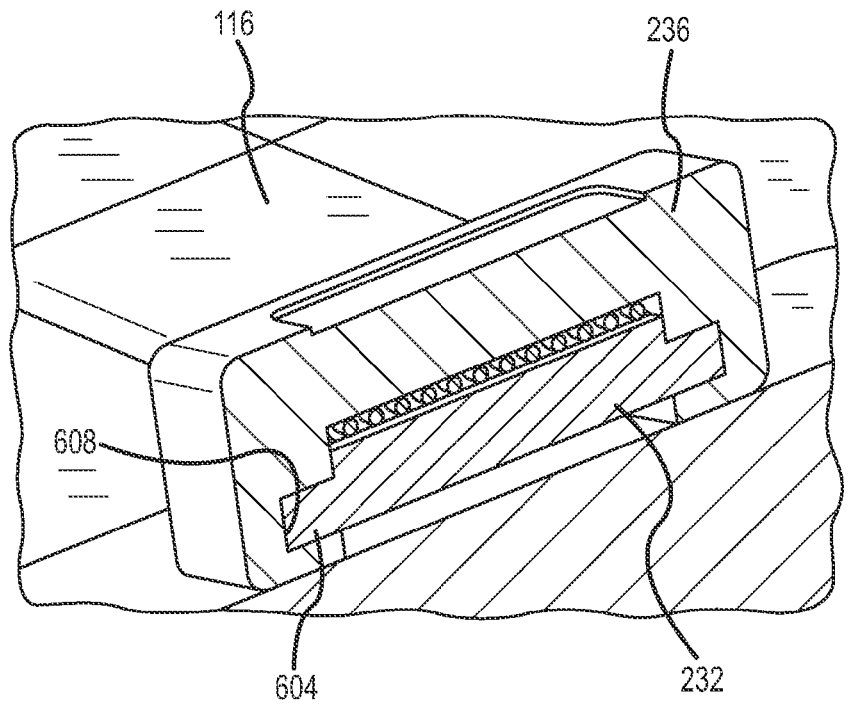
FIG. 6A is a cross-sectional view of a first fiber retaining structure in accordance with embodiments of the present disclosure.

FIG. 6A shows one possible configuration of first and second fiber retainers 232, 236 in accordance with embodiments of the present disclosure. More specifically, the first fiber retainer 232 may slide into the second fiber retainer 236 and the relative position of the two fiber retainers 232, 236 may be secured by a tongue 604 and groove 608 set of features on the retainers 232, 236. As mentioned above, once the first fiber retainer 232 is slid into the second fiber retainer 236, the fiber 116 may be substantially fixed relative to the second connector module 112. An adhesive may then be applied to ensure that the fiber ends interact with the lens components of the second connector module 112 in a desired fashion.

Figure 6B:
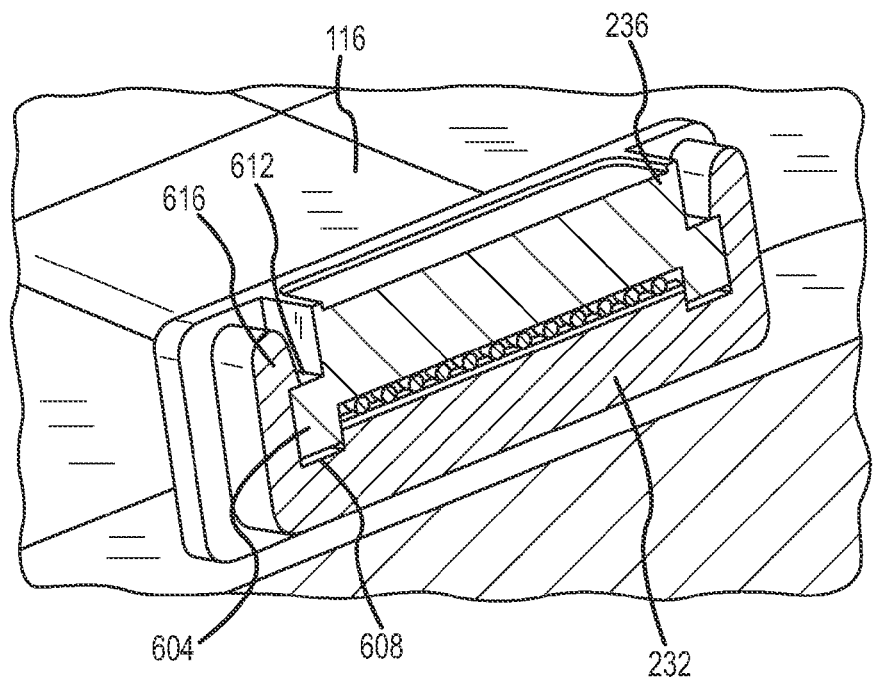
FIG. 6B is a cross-sectional view of a second fiber retaining structure in accordance with embodiments of the present disclosure.

FIG. 6B depicts another possible configuration of first and second fiber retainers 232, 236 in accordance with embodiments of the present disclosure. Specifically, the first fiber retainer 232 is configured to snap onto the second fiber retainer 236. Even more specifically, the first fiber retainer 232 may comprise the groove 608 feature while the second fiber retainer 236 may comprise the tongue 604 feature. In addition to the tongue and groove features, the first fiber retainer 232 may further comprise a clip 616 while the second fiber retainer 236 comprises a corresponding lip 612 that interacts with the clip to facilitate a friction fit between the two fiber retainers 232, 236. While the first fiber retainer 232 is shown as including the clip 616 and the second fiber retainer 236 is shown as including the lip 612, it should be appreciated that the first fiber retainer 232 may comprise the lip 612 and the second fiber retainer 236 may comprise the clip 616 without departing from the scope of the present disclosure. In the snap-in configuration, the second fiber retainer 236 is also shown as including a back wall that substantially prevents the first fiber retainer 232 from sliding backwards with respect to the second fiber retainer 236.

Figure 7:
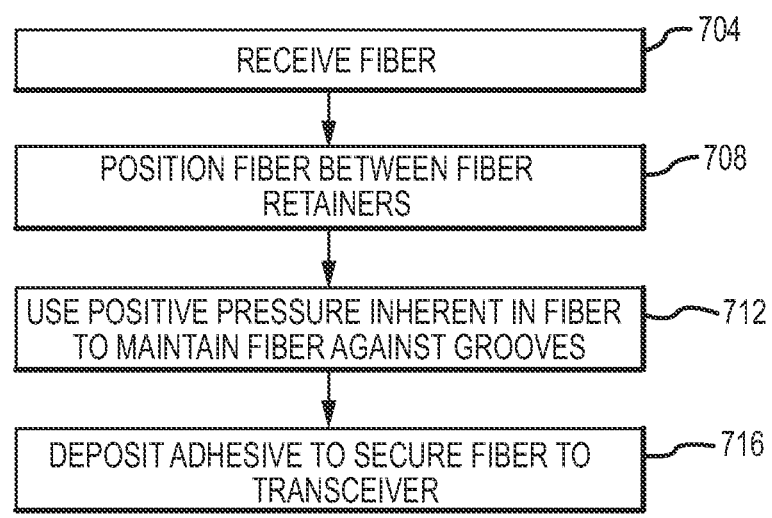
FIG. 7 is a flow chart depicting a fiber-to-lens attach method in accordance with embodiments of the present disclosure.

With reference now to FIG. 7, a fiber-to-lens attach method will be described in accordance with embodiments of the present disclosure. The method begins upon the receipt of the fiber 116 (step 704). After the fiber 116 has been received, the fiber 116 may be positioned between the fiber retainers 232, 236 (step 708). In some embodiments, the fiber retainers 232, 236 are configured to pivot the fiber 116 at an angle θ relative to grooves 304, thereby imparting a positive pressure that maintains the fiber 116 against the grooves 304 (step 712). While the positive pressure is applied due to the inherent stiffness of the fiber 116, an amount of adhesive may be deposited between the fiber 116 and second connector module 112 to secure the fiber 116 to the second connector module 112 and the optical transceiver (step 716).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An optical system, comprising:
  a Printed Circuit Board (PCB) comprising optical and electrical components mounted thereon;
  a main connector module adapted to substantially enclose the optical and electrical components within a cavity;
  a second connector module adapted to be removably attached to the main connector module such that when the second connector module is attached to the main connector module, a lens component of the second connector module is positioned in an operable position with respect to the optical components mounted on the PCB; and
  a pair of fiber retainers adapted to receive and retain optical fiber at an angle greater than zero with respect to grooves that support and position the optical fiber relative to the lens component of the second connector module.

2. The system of claim 1, wherein the pair of fiber retainers include a first fiber retainer and a second fiber retainer, wherein at least one of the first and second fiber retainer are integrally formed with respect to the second connector module and wherein the other of the first and second fiber retainer are removable from the second connector module.

3. The system of claim 2, wherein the first and second fiber retainer interface via a tongue and groove to substantially fix the first fiber retainer relative to the second fiber retainer.

4. The system of claim 3, wherein the first fiber retainer slides into the second fiber retainer.

5. The system of claim 3, wherein the first fiber retainer snaps into the second fiber retainer.

6. The system of claim 1, wherein the pair of fiber retainers position the optical fiber onto the grooves such that a positive pressure inherently applied by a stiffness of the optical fiber causes the optical fiber to maintain a contact with the grooves in the absence of additional outside forces.

7. The system of claim 1, wherein the second connector module comprises:
  an end wall configured to interface with ends of the optical fiber; and
  a step-back well positioned between the grooves and the end wall.

8. The system of claim 1, wherein the main connector module and second connector module interface with a receiving block and corresponding protruding feature at a point where light passes from the second connector module to the optical component.

9. The system of claim 8, wherein the main connector module comprises the receiving block and the second connector module comprises the corresponding protruding feature.

10. The system of claim 1, wherein the grooves comprise a plurality of substantially rectangular grooves configured to support individual fibers of the optical fiber.

11. The system of claim 1, wherein the optical component comprises at least one of a Vertical-Cavity Surface-Emitting Laser (VCSEL), laser diode, Light Emitting Diode (LED), array of LEDs, photodiode, and photosensor.

12. A device for attaching an optical fiber to a transceiver, the device comprising:
  a main connector module that interfaces with a Printed Circuit Board (PCB);
  a second connector module adapted to be removably attached to the main connector module such that a lens component of the second connector module is optically aligned with an optical component mounted on the PCB;

a first fiber retainer; and a second fiber retainer adapted to cooperate with the first fiber retainer and retain an optical fiber at an angle greater than zero with respect to a support structure that supports and position the optical fiber relative to the lens component of the second connector module.

13. The device of claim 12, wherein the angle is between 1 degree and 45 degrees relative to the support structure.

14. The device of claim 12, wherein the support structure comprises a plurality of grooves, each of which support and position individual fibers in the optical fiber.

15. The device of claim 14, wherein the plurality of grooves comprise a planar surface connecting a first substantially planar side surface with a second substantially planar side surface.

16. The device of claim 12, wherein the second fiber retainer is integral to the second connector module.

17. The device of claim 12, wherein the main connector module comprises a receiving block and the second connector module comprises a protruding feature that mates with the receiving block and wherein light transmitted between the optical component and optical fiber passes through the protruding feature and receiving block.

18. The device of claim 12, wherein the second connector module and main connector module clip together with a pair of clips.

19. A method of attaching an optical fiber to a transceiver, the method comprising:

receiving an optical fiber;

positioning the optical fiber between a pair of fiber retainers such that the optical fiber impacts grooves at an angle greater than zero and the grooves support and position the optical fiber with respect to a lens component of the transceiver; and without applying additional forces to the optical fiber other than forces applied by the pair of fiber retainers, depositing adhesive to the optical fiber such that the optical fiber is adhered to the grooves.

20. The method of claim 19, wherein depositing adhesive comprising filling a step-back well with adhesive, the step-back well being positioned between the grooves and the lens component.

* * * * *